United States Patent
Malone et al.

(10) Patent No.: US 9,698,714 B2
(45) Date of Patent: Jul. 4, 2017

(54) SYSTEM AND METHOD FOR ASYNCHRONOUS PERMANENT MAGNET MOTOR OPERATION

(71) Applicant: ACCESSESP UK LIMITED, Houston, TX (US)

(72) Inventors: David Malone, Houston, TX (US); Omar Benzaid, Katy, TX (US); Aider Matarrita Sequeira, Katy, TX (US)

(73) Assignee: ACCESSESP UK LIMITED (GB)

( * ) Notice: Subject to any disclaimer, the term of this patent is extended or adjusted under 35 U.S.C. 154(b) by 133 days.

(21) Appl. No.: 14/521,309

(22) Filed: Oct. 22, 2014

(65) Prior Publication Data

US 2016/0118919 A1   Apr. 28, 2016

(51) Int. Cl.
| | |
|---|---|
| *H02P 8/38* | (2006.01) |
| *H02P 23/00* | (2016.01) |
| *H02P 23/14* | (2006.01) |
| *E21B 43/12* | (2006.01) |
| *H02K 5/132* | (2006.01) |
| *H02P 25/03* | (2016.01) |

(Continued)

(52) U.S. Cl.
CPC ............ *H02P 8/38* (2013.01); *E21B 43/128* (2013.01); *H02K 5/132* (2013.01); *H02P 23/0036* (2013.01); *H02P 23/14* (2013.01); *H02P 25/024* (2016.02); *H02P 25/03* (2016.02); *H02P 29/028* (2013.01); *H02P 25/026* (2013.01); *Y10T 29/49009* (2015.01)

(58) Field of Classification Search
CPC ...... H02P 1/42; H02P 7/29; H02P 1/18; H02P 6/14; H02P 8/38; H02P 23/0036; H02P 23/14; H02P 6/20; H02P 6/205; H02P 2209/07; H02P 6/10; H02P 25/03; H02P 25/024; H02P 25/026; H02P 29/028; B62D 5/0463; B62D 5/046; E21B 43/128; H02K 5/132; Y10T 29/49009
See application file for complete search history.

(56) References Cited

U.S. PATENT DOCUMENTS

| | | | |
|---|---|---|---|
| 6,644,310 B1 * | 11/2003 | Delache | A61M 16/00 128/204.18 |
| 7,378,769 B2 | 5/2008 | Head | |

(Continued)

FOREIGN PATENT DOCUMENTS

GB   2495054   12/2015

OTHER PUBLICATIONS

Schlumberger, "Variable Speed Drives Optimize Production Potential", 2011, 7 pages.

*Primary Examiner* — Michael Zarroli
(74) *Attorney, Agent, or Firm* — Gordon G. Waggett P.C.

(57) ABSTRACT

A method for implementing asynchronous operation of a permanent magnet motor (PMM) by detecting asynchronous operation of the PMM and creating cyclic variations in the PMM output using the asynchronous operation of the PMM. In another embodiment, an apparatus that comprises a microcontroller that obtains computer executable instructions stored on a non-transitory medium that when executed by the microcontroller causes the apparatus to determine that a rotor shaft within a PMM is rotationally restricted and to vary a plurality of frequencies and a plurality of amplitude currents supplied to the monitor to produce a reverse impact on a downhole tool coupled to the PMM.

25 Claims, 6 Drawing Sheets

(51) Int. Cl.
*H02P 29/028* (2016.01)
*H02P 25/024* (2016.01)
*H02P 25/026* (2016.01)

(56) References Cited

U.S. PATENT DOCUMENTS

| | | | |
|---|---|---|---|
| 7,504,752 B2 | 3/2009 | Head | |
| 7,602,139 B2* | 10/2009 | Ho | H02P 6/185 |
| | | | 318/400.02 |
| 8,624,532 B2* | 1/2014 | Chuah | H02P 6/18 |
| | | | 318/400.01 |
| 8,672,641 B2* | 3/2014 | Yuratich | E21B 43/128 |
| | | | 417/44.1 |
| 8,823,334 B2* | 9/2014 | Huang | H02P 6/20 |
| | | | 318/432 |
| 9,054,615 B2 | 6/2015 | Head et al. | |
| 2007/0273225 A1 | 11/2007 | Head | |
| 2015/0171704 A1* | 6/2015 | Borgen | H02K 7/003 |
| | | | 310/51 |
| 2015/0288311 A1 | 10/2015 | Head et al. | |

* cited by examiner

SYSTEM AND METHOD FOR ASYNCHRONOUS PERMANENT MAGNET MOTOR OPERATION

BACKGROUND OF THE INVENTION

Field of the Disclosure

This disclosure relates generally to implementing the asynchronous operation of permanent magnet motors (PMM), particularly though not exclusively in a downhole environment, such as a hydrocarbon (e.g., oil, gas, or mixed oil and gas) well.

Description of the Related Art

Electric submersible pump (ESP) systems are typically installed in oil and gas wells where reservoir pressure is inadequate to lift reservoir fluids to the surface or to increase production in natural producing wells. As a reservoir is produced, the pressure in the pore space of the rocks decreases, and thus may require the introduction of some type of artificial lift system to continue production as a reservoir or a well ages. An ESP system provides an artificial lift for a reservoir and/or well and comprises a motor to convert electrical power from a cable to mechanical power to drive the pump. ESP systems may be installed with induction motors (IMs) or PMMs.

Although ESP systems are used world-wide, ESP systems typically suffer from numerous problems that cause ESP systems to be relatively expensive to operate and susceptible to failure. For instance, when a typical ESP system fails, the entire production tubing string may be removed from the well to replace the ESP system. Removal of the entire production tubing string is relatively expensive and a time consuming process that may require a workover rig. In many geographic areas, workover rigs are not readily available or may be difficult to transport or deploy in offshore environments or other remote locations. In some instances, weeks or months may elapse in order to deploy a workover rig to replace a failed ESP system.

Moreover, many reservoirs are located within sandstone. As these reservoirs are produced, the sandstone often disintegrates, causing significant sand volumes to travel to the surface along with the produced fluid. The sand is normally removed at the surface and does not present a significant problem other than pump wear. However, when the sand becomes embedded in the pump stages, the sand can create very high loads in the ESP system by making the rotation of the pump difficult or nearly impossible, and thus may require replacement of the ESP system. Furthermore, difficultly in achieving or maintaining the desired rotation of the pump components can have adverse repercussions on the operating life of the pump motor, and in some instances can lead to damage or failure of the motor. For example, if the pump system is shut down during production, the sand in the fluid column can fall onto the ESP system. In other instances, changes in the reservoir and reservoir fluid can produce relatively large slugs of sand that congest and restrict rotation of the coupled pump and motor components of ESP system. Similarly, pipe scale, highly viscous fluids (particularly when operating the system in relatively cold environments), and other debris can create blockage of the pump, inhibit rotation of the coupled pump and motor components, and force removal and repair or replacement of the ESP system to continue production.

BRIEF SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one illustrative embodiment, a method comprising: detecting an asynchronous operation of a PMM within a downhole tool; interrupting motor operation, such as a startup acceleration procedure for the PMM, wherein the motor operation is associated with at least a drive frequency and a drive amplitude of the PMM; and creating cyclic torque variations in the PMM output through asynchronous operation of the PMM.

In another illustrative embodiment, an apparatus comprising: a microcontroller; a switching unit coupled to the microcontroller, wherein the switching unit is configured to transport control signals between the microcontroller and switching unit, and wherein the microcontroller obtains computer executable instructions stored on a non-transitory medium that when executed by the microcontroller causes the apparatus to perform the following: determine that a rotor shaft within a PMM is substantially restricted; interrupt motor operation for the PMM that operates the PMM at a prescribed drive frequency and a prescribed drive amplitude; and vary between a plurality of current frequencies and a plurality of current amplitudes supplied to the PMM to produce a cyclic impact on a downhole tool coupled to the PMM through asynchronous operation of the PMM to loosen the debris that is inhibiting rotation.

In another illustrative embodiment, a method comprising: identifying a rotor of a permanent magnet motor is substantially locked using a motor drive signal supplied to the permanent magnet motor; discontinuing a current operation of the permanent magnet motor, wherein the current operation is related to at least a current frequency and a current amplitude of the permanent magnet motor; and creating cyclic impacts using the permanent magnet motor by varying the current frequency, the current amplitude, or both after identifying the rotor of the permanent magnet motor is substantially locked.

BRIEF DESCRIPTION OF THE DRAWING

For a more complete understanding of this disclosure, reference is now made to the following brief description, taken in connection with the accompanying drawings and detailed description, wherein like reference numerals represent like parts.

Figure 1:
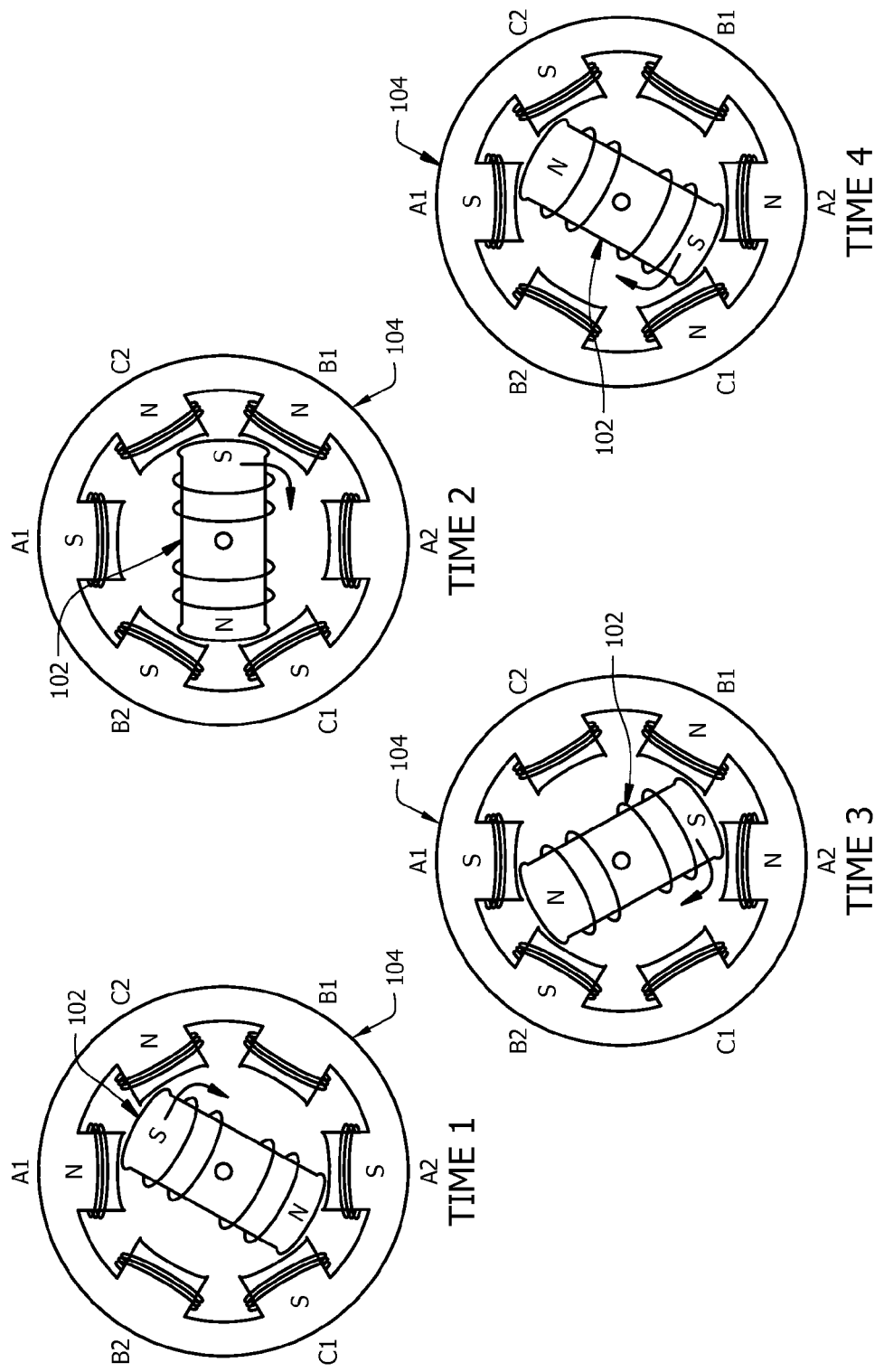
FIG. 1 illustrates an embodiment of a motor that comprises a rotor and a stator assembly.

While certain embodiments will be described in connection with the preferred illustrative embodiments shown herein, it will be understood that it is not intended to limit the invention to those embodiments. On the contrary, it is intended to cover all alternatives, modifications, and equivalents, as may be included within the spirit and scope of the invention as defined by claims to be filed in a subsequent non-provisional patent application. In the drawing figures, which are not to scale, the same reference numerals are used throughout the description and in the drawing figures for components and elements having the same structure, and primed reference numerals are used for components and elements having a similar function and construction to those components and elements having the same unprimed reference numerals.

DETAILED DESCRIPTION

It should be understood that, although an illustrative implementation of one or more embodiments are provided below, the various specific embodiments may be implemented using any number of techniques known by persons of ordinary skill in the art. The disclosure should in no way be limited to the illustrative embodiments, drawings, and/or techniques illustrated below, including the exemplary designs and implementations illustrated and described herein. Furthermore, the disclosure may be modified within the scope of the appended claims along with their full scope of equivalents.

Traditionally, ESP systems have relied on IMs as the prime mover. IMs are relatively simple devices that are used throughout industry because of the simplicity of control and operation. However, PMMs are becoming increasingly desirable within the ESP market for a variety of reasons. For instance, PMMs have relatively higher power density than a comparable IM. PMMs are also more efficient in terms of electrical energy input to mechanical energy output when compared to a relatively equivalently sized IM. Higher efficiency may lead to lower operating costs and cooler operations. PMMs are also relatively more efficient and generate relatively less heat at a given output than IMs. Less heat generation improves motor reliability and allows PMM-based pumping systems to be used in hotter wells. PMMs can also generate more torque at startup and at low speeds than comparable IMs. The additional torque availability at low speeds and at startup may allow a pumping system to operate in cases where an IM based pumping system may be in a substantially locked state because of sand or other debris.

FIG. 1 illustrates an embodiment of a motor that comprises a rotor 102 and a stator assembly 104. The motors used within an ESP system, a Measurement-While-Drilling (MWD) system, or any other downhole system comprising an electrical motor, may rely on an interaction between a rotor magnetic field and a stator magnetic field. The stator field is typically generated by the application of a sinusoidal current across windings embedded in the stator assembly 104. The current creates a radial magnetic field in the stator assembly 104 that attracts and repels a magnetic field in the rotor 102, causing the rotor 102 to rotate and generate torque. Specifically, FIG. 1 illustrates the interaction between the rotor magnetic field and the stator magnetic field used to rotate the rotor at different time instances, which are labeled as Time 1 to Time 4. The interaction between the rotor and stator magnetic field is common to both IMs and PMMs. Typically, the stators for both IMs and PMMs can be substantially similar.

One of the differences between PMMs and IMs is the method used to generate the rotor magnetic field. In a PMM, the magnetic field is generated with permanent magnets that are affixed to the rotor 102. Because the rotor magnetic field is stationary relative to the rotor 102, the stator field and stator current are controlled in order to position the stator field ahead of the rotor field in the desired direction of rotation. PMMs are often referred to as synchronous machines because the rotor and stator magnetic field are synchronized and rotate at substantially the same speed. If the load and torque on a PMM rotor exceeds the pullout torque, from the interaction of the motor magnetic fields, asynchronous operation of the motor (i.e., also known as slipping poles) can also occur. In other words, asynchronous operation of the PMM may occur when the rotor and stator magnetic field rotate at different speeds.

Asynchronous operation of a PMM (i.e., slipping poles) is usually not desirable. For example, asynchronous operation of the PMM can occur when the magnetic field of the stator continues to move around the stator 104 while the rotor 102 remains restricted, or in some instances nearly stationary (e.g., in a locked position). When a PMM is operating asynchronously, the motor can output cyclic torques that vary from positive to negative at a frequency which is proportional to the rotational frequency of the stator magnetic field. In some instances, the magnitude of the cyclic torque is proportional to the current applied to the stator magnetic field. If not properly monitored and controlled asynchronous operation of a PMM may damage system components and subject the motor to large dynamic forces. Asynchronous operation may occur when the motor starts-up or during normal operation. Although asynchronous operation is normally an undesirable event, if properly controlled, the cyclic torques generated during asynchronous operation can be beneficially used (e.g., to free a non-rotating pump).

Figure 2:
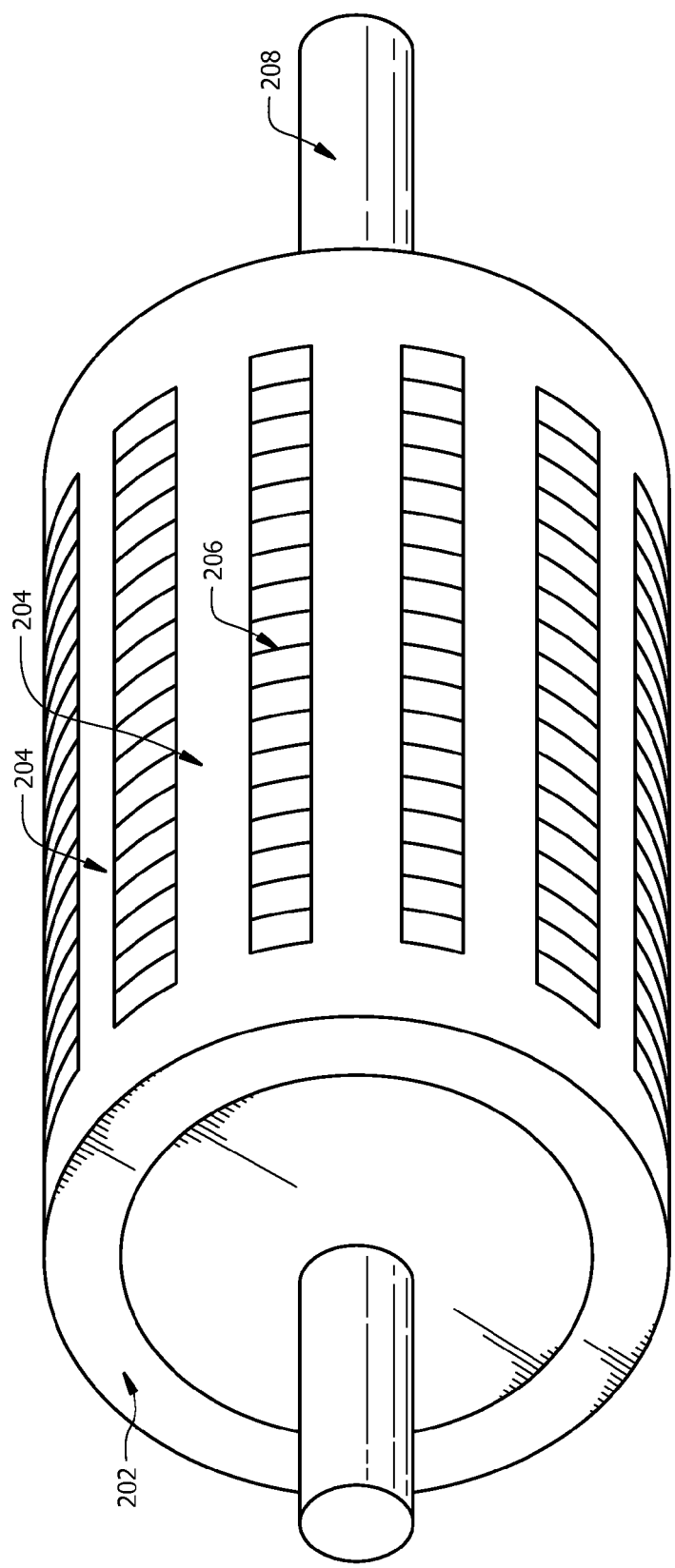
FIG. 2 is a schematic diagram of an embodiment of the rotor of an IM.
Figure 3:
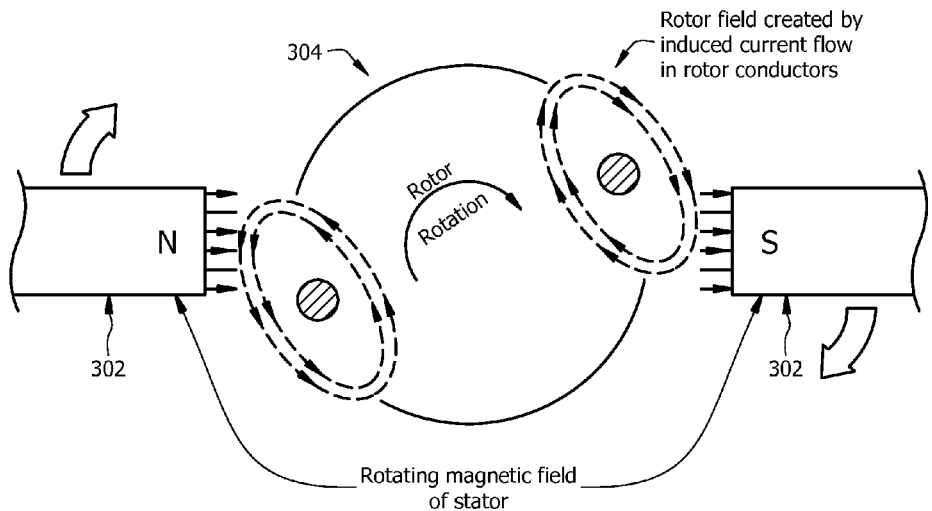
FIG. 3 is a schematic diagram of an embodiment of an IM and the magnetic properties associated with the IM.

The operating mechanism of an IM is such that the rotor and stator magnetic field are rotating at different speeds. By the nature of their operation, IMs are referred to as asynchronous machines. Due to this operating mechanism, IMs are not subject to slipping poles and therefore do not allow for the generation of cyclic torques through asynchronous operation. FIGS. 2-3 are schematic diagrams of embodiments of an IM. In particular, FIG. 2 illustrates the different components of an IM, and FIG. 3 illustrates magnetic properties of the IM. As shown in FIG. 2, the IM may comprise an end ring 202 (e.g., aluminum end ring), a plurality of conductor bars 204 (e.g., aluminum bars), a plurality of laminations 206 (e.g., steel laminations), and a shaft 208. FIG. 3 illustrates that the interaction of the stator magnetic field from stators 302 with the conductor bars (e.g., conduction bars 204) embedded in the rotor 304 generates the rotor magnetic field of the IM. As the stator field rotates relative to the rotor 304, the IM creates an electrical current that passes through the conductive bars in the rotor 304. The induced electrical current produces a magnetic field extending radially from the rotor. The interaction of this induced field with the stator field drives the rotor in the same manner as the PMM.

There are several notable characteristics for the induced field produced within the IM. First, the rotor current and rotor magnetic field is generated when there is a difference in the rotor rotational speed ($\omega\_rotor$) and the rotational speed of the stator magnetic field (ω_(stator magnetic field)). This difference is referred to as Slip and is represented below in equation 1:

$$\text{Slip}=\omega\_(\text{stator magnetic field})-\omega\_\text{rotor} \quad (1)$$

The rotor current, and thus, the strength of the rotor magnetic field, are proportional to the current applied to the stator and the magnitude of the Slip. Because the rotor and stator magnetic field of an IM are rotating at different speeds, Slip typically exists for IMs during operation of the motor. Although the physics of an IM are relatively more complex than a PMM, the operation and control of an IM are generally relatively simpler. One reason is that IMs may be self-correcting in that the rotor magnetic field is not fixed to the rotor as in a PMM. However, with respect to PMM and in direct contrast to IMs, once the PMM slips and the stator magnetic field and rotor are no longer rotating at the same speed, the undesired phenomenon of slipping poles occurs and the PMM falls out of synchronous operation and operates asynchronously.

Figure 4:
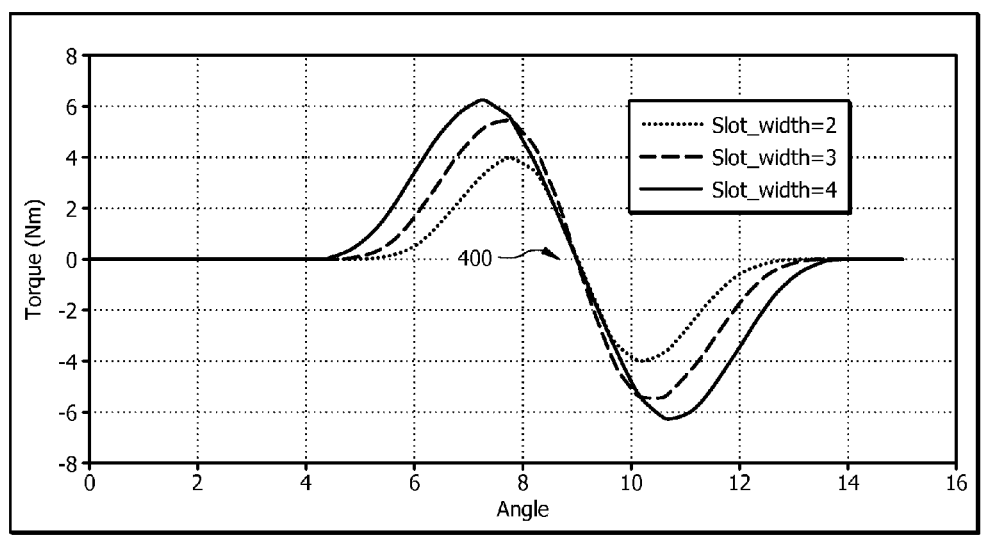
FIG. 4 illustrates a typical torque profile of a PMM in asynchronous operation.

FIG. 4 illustrates a typical torque profile of a PMM in asynchronous operation (slipping poles). Specifically, FIG. 4 illustrates three different asynchronous torque profiles based on the three different slot widths (e.g., slot width configuration numbers 2, 3, and 4). The slot width configuration numbers 2, 3, and 4 generally refer to three different lamination configuration in an increasing order. For instance, slot width configuration number 4 may have a slot width greater than slot width configuration number 3; slot width configuration number 3 may have a slot width greater than slot width configuration 2 and so forth.

As shown in FIG. 4, when the stator magnetic field continues to rotate and the rotor magnetic field is stationary (e.g., rotor in a locked position), the output torque of the motor, which is against the stationary load, will progress through positive and negative torque outputs as the rotor to stator magnetic field passes from one stator magnetic pole to the next. In effect, the rotor is being pulled by the stator magnetic field until the angle between the rotor magnetic field and stator magnetic field becomes so large that the rotor begins to be impacted by the magnetic flux of the trailing stator magnetic field. Eventually, the rotor passes through a neutral point, which is shown as reference point 400 and at about nine degrees in FIG. 4, where the magnetic forces on the rotor are balanced between the leading and trailing stator magnetic poles resulting in essentially zero output torque. As the stator field continues to rotate around the stationary rotor, the influence of the trailing stator magnetic field, which is opposite in polarity to the now adjacent rotor field, reverses the direction of the applied torque on the rotor. The reversing torque cycle happens once per stator and/or rotor pole pair resulting in a reversing impact that occurs once with each motor pole transition. The application of the reversing impact or the generation of negative torque on the rotor may be translated through the rotor shaft to components of a downhole tool coupled to the rotor shaft. By way of repeated reversing impacts and cyclic generation of negative torque, a cyclical impact (i.e., "jackhammer-like" impact) may be imparted to the restricted or locked downhole tool components. In some instances, this cyclical impact (i.e., "jackhammer-like" impact) may be sufficient to free the impinged component and allow its desired rotation or movement.

The torque profile may be controlled as a function of current frequency and current amplitude, which may be supplied at any desired amplitude and frequency within the range limits of a motor. In one embodiment, the torque profile may include torque cycles that have vigorous and rapid reversals by supplying relatively high current amplitude with relatively high current frequency to the motor. For example, current amplitude in about the range of 100 percent to 125 percent of nominal motor current and frequencies between 75 percent and 100 percent of nominal values may produce vigorous and rapid reversals. Alternatively, the torque cycles may have slight and slow reversals by supplying relatively low current and relatively low frequency. For example, current amplitude in about the ranges of 50 percent to 75 percent of nominal motor current and frequencies between 25 percent and 75 percent of nominal values may produce slight and slow reversals. The values for the nominal motor currents and frequencies may vary depending on the design parameters of the motor(s) used in the downhole tool. The design parameters of motors can usually be found on motor nameplates that may include motor information, such as manufacturer's type of motor, rated volts (V) of operation and full load Amperes (A), rated frequency of operation and number of phases (e.g., single-phase or 3-phase motor), rated full load speed, rated horsepower and torque, and efficiency. In some embodiments, the values of the nominal motor current for motors used in downhole tool may range from about 38 A to about 200 A and the values of the nominal frequencies used in downhole tool may range from about 60 Hz to about 120 Hz. In one embodiment, the motor used for an ESP system may have a nominal motor current of about 50 A and a nominal frequency of about 120 Hz, which matches the speed of pumps at 3600 Revolutions Per Minute (RPM).

In the PMM ESP application, the motor is normally thousands of feet below the surface of the earth without sensors that directly measure the position or velocity of the rotor shaft in order to provide feedback that asynchronous operation is occurring, or more particularly that the pump shaft is restricted from freely rotating or is substantially locked. There are, however, a number of ways to sense asynchronous operation in the absence of visual confirmation or direct sensing that include, but are not limited to, sensing of the current being delivered to the motor. For example, when initiating operation of a motor, the frequency and voltage of the drive signal to the motor begins at a relatively low frequency. In one embodiment, the startup frequency may typically start at about 1-5 hertz (Hz) depending on the drive configuration for both a medium voltage variable speed drive (VSD) and a low voltage VSD. Typically, the low voltage VSD may be coupled to a transformer and may incur power loss at the relatively low frequency. Conversely, the medium VSD may incur zero or near zero power loss because the medium VSD are usually not coupled to a transformer. The frequency may be subsequently increased at a rate determined by the configuration of the variable speed drive. If the motor is operating synchronously, then the rotor shaft follows the magnetic forces generated by the stator. Under synchronous operations, the motor typically has a substantially sinusoidal or near sinusoidal voltage and current signal. However, under asynchronous operations, the current and voltage waveforms become disrupted and may change abruptly. The term VSD may be used interchangeably with the terms "variable frequency drive," "adjustable frequency drive," "AC drive," "micro drive," or "inverter drive" throughout this disclosure.

Disclosed herein are one or more embodiments used to detect and advantageously implement asynchronous PMM operations. In one embodiment, the PMM may be located within an ESP system and used in a manner of asynchronous operation to free and restart the rotation of a pump in the ESP system that is restricted because of debris. The ESP system may comprise a PMM as the prime mover and a motor control system, such as a VSD, used to drive the PMM. The control system or a separate sensor system may comprise sensors (e.g., a motor drive signal) in conjunction with one or more algorithms to determine whether a PMM rotor is not rotating in synchronization with the stator magnetic field. The detection of asynchronous operation may occur during start up and/or while in operation of the pump. If the control system recognizes that the rotor is not synchronized with the rotating stator field, an operator and/or a control logic system (e.g., the VSD or an external microcontroller) may initiate a controlled application of reversing impact or negative torque generation described above within the asynchronous operation of the PMM to loosen material, such as sand, scale, and/or vicious fluids that are preventing rotation of the pump. In other embodiments, other downhole tool systems comprising a PMM, such as MWDs, may initiate controlled PMM asynchronous operations to remove debris and restart the rotation of the downhole tool systems.

Figure 5:
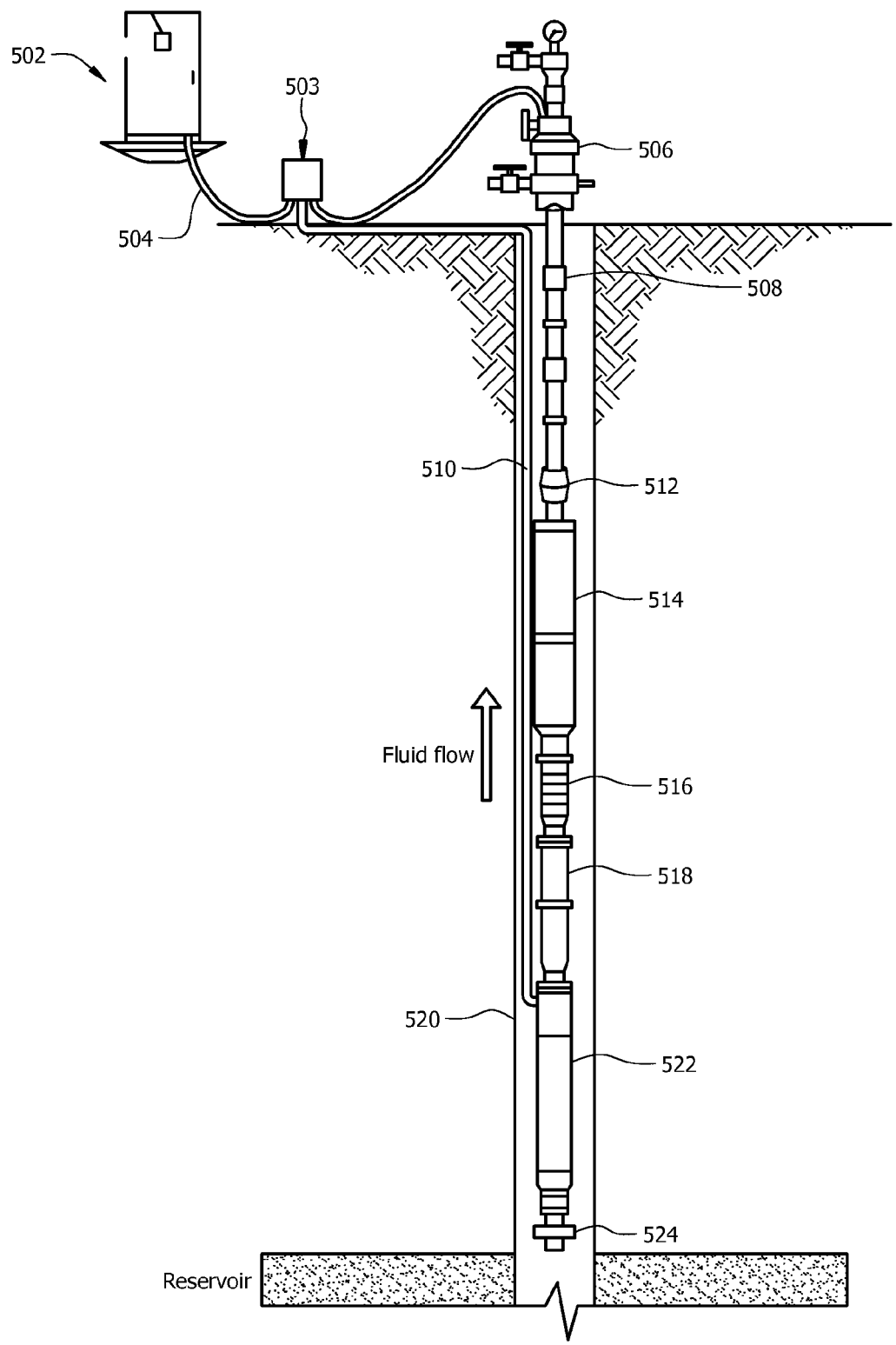
FIG. 5 is a schematic diagram of an embodiment of an ESP system, where various embodiments may operate within.

FIG. 5 is a schematic diagram of an embodiment of an ESP system, where various embodiments may operate within. As shown in FIG. 5, an ESP system is attached to the production tubing string 508 in an oil well. A surface cable 504, which typically comprises three conductors (e.g., American Wire Gauge (AWG) 1, 2 or 4 solid copper) extends from a motor control system 502, such as VSD system. In one embodiment, the motor control system 502 may be a medium voltage VSD that is configured to operate without a step-up transformer 503. In another embodiment, the motor control system 502 may be a low voltage VSD that is coupled to a step-up transformer 503. The motor control system 502 may be configured to operate PMMs or both IMs and PMMs. In one embodiment, the motor control system 502 may be covered within National Electrical Manufacturers Association (NEMA), 1, 3R, 4, 4X enclosures rated from about 58 to 1200 A. The motor control system 502 may also be configured to include optional output Sine-Wave filters and Institute of Electrical and Electronics Engineers (IEEE) input harmonics filters. The motor control system 502 may further comprise a display and one or more input devices, such as a keyboard, to display and input data into the motor control system 502. The monitor control system 502 will be discussed in more detail in FIG. 9.

The ESP system further comprises an adapter 512, a pump 514, a pump admission 516 (e.g., pump intake), a protector 518 (e.g., a seal), and a motor 522. The adaptor 512 may be a pipe configured to mechanically couple the ESP system to the production tubing string 508. The pump 514 may be configured to move fluid in the direction of the surface by generating a differential pressure across the ESP system. For example, the pump 514 may be centrifugal (i.e., radial), axial, or mixed-flow multi-stage pump. The differential pressure drives the fluid to the surface (e.g., upward direction in FIG. 5), which is described in more detail in FIG. 6. The pump admission 516 (e.g., pump intake) is configured to allow the production fluid to enter the pump from the annular area defined by the identifier (ID) of the casing and outside of the ESP system. The protector 518 may be a rotating seal system that isolates wellbore fluid, which can be relatively dirty and can be corrosive, from the lubricating oil inside the motor 522. The motor 522, which may be a PMM, is configured to convert electrical power received from the electrical cable 510 to mechanical power in order to drive the pump. FIG. 5 also illustrates a well head 506 that provides the structural and pressure-containing interface for the drilling and product equipment. The casing 520 may be an installed pipe used to line the well hole to typically implement pressure containment and to prevent the collapse of the well during the drilling phase. In some embodiments, the ESP system may further comprises a centralizer 524 that is configured to be a contact point with the casing 520 and allow the ESP system to have some standoff clearance. As shown in FIG. 5, centralizer 524 is typically located at the bottom of the ESP system.

Figure 6:
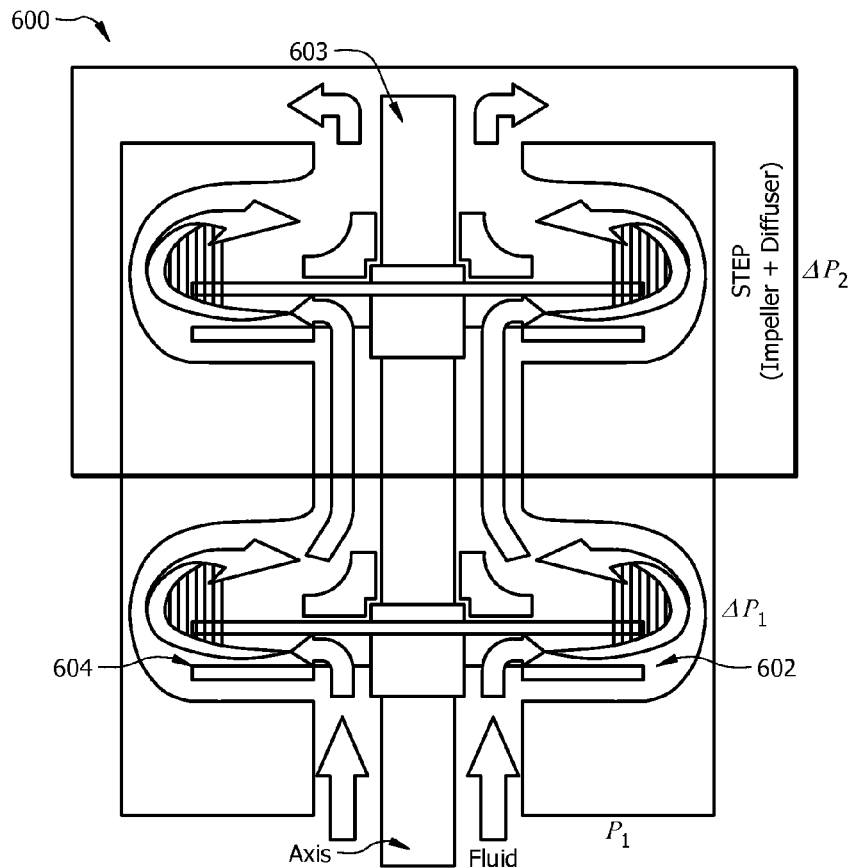
FIG. 6 is a schematic diagram of an embodiment of an ESP pump.

FIG. 6 is a schematic diagram of an embodiment of an ESP pump 600 showing two steps or stages. Fluid from the reservoir is drawn upward by the ESP system using the ESP pump 600. The fluid initially moves through the annular area between the motor and the inside diameter of the casing to aid in cooling the motor (not shown in FIG. 6). When the fluid reaches the pump admission 516 (e.g., pump intake), the fluid moves from the annular area into the ESP pump 600. The ESP pump 600 may be a centrifugal flow pump that comprises a plurality of pump stages. Each pump stage comprises an impeller 602 and a diffuser 604 coupled to a common shaft 603. The ESP pump shaft 603 is coupled to the ESP motor 502 (which can be an IM or PMM). The common shaft 603 transmits the rotary motion produced by the ESP motor to the impellers 602 of the pump stage. The common shaft 603 and impellers 602 are coupled by a key, and the key transmits the torque load to the impeller 602. The impeller 602 is rotated at a relatively high speed, typically about 1800-3600 RPM relative to the diffuser 604, which forces the fluid at a relatively high velocity towards the outside of the pump housing where the diffuser turns the fluid to drive it axially upward. An axial flow pump may perform a similar action, but the rotary energy is used to drive the fluid directly upward. An ESP pump 600 may have a plurality of pump stages to generate the required differential pressure. Typically, an ESP pump 600 can have about 50-200 stages.

In an ESP system according to embodiments described herein, a method of use may be applied to free and restart the rotation of a pump using the controlled asynchronous operation of a PMM when the pump has stopped rotating. For instance, the pump may not be rotating at startup (i.e., near or about zero RPM) and/or when the shaft is substantially locked (i.e., locked or nearly locked). A method according to embodiments described herein may interrupt the motor operation, whether in startup or at operation speeds, in the event that asynchronous operation of the PMM is detected. In other words, motor operations may refer to the different operating states and/or parameters of the motor within a downhole tool, which may include the acceleration startup procedures and motor operating speeds.

Afterwards, the method may instruct the stator magnetic field to follow a prescribed sequence that varies the frequency and/or amplitude of the rotating stator magnetic field to create cyclic variations in the motor torque, and specifically reversing rotor impacts during asynchronous operation. In one embodiment, the varying of frequency and/or amplitude may be a series of increasing current frequencies and/or current amplitudes delivered to the stator for generating the stator magnetic field. The resulting cyclic, reversing variations in torque amplitude and frequency may create a cyclic impact that may loosen the material (e.g., sand, scale, viscous fluids) restricting rotation of the pump. The frequency and/or amplitude of the rotating stator magnetic field, which is generated from applied current and/or voltage, may also be referenced throughout this disclosure as the drive frequency and the drive amplitude, respectively. Persons of ordinary skill in the art are also aware that the current amplitude supplied to the PMM may have a direct correlation to the reversing dynamic torque produced by the PMM, and the frequency of the supplied current will determine the frequency of the dynamic torque if the rotor shaft is locked or restricted in rotation.

Figure 7:
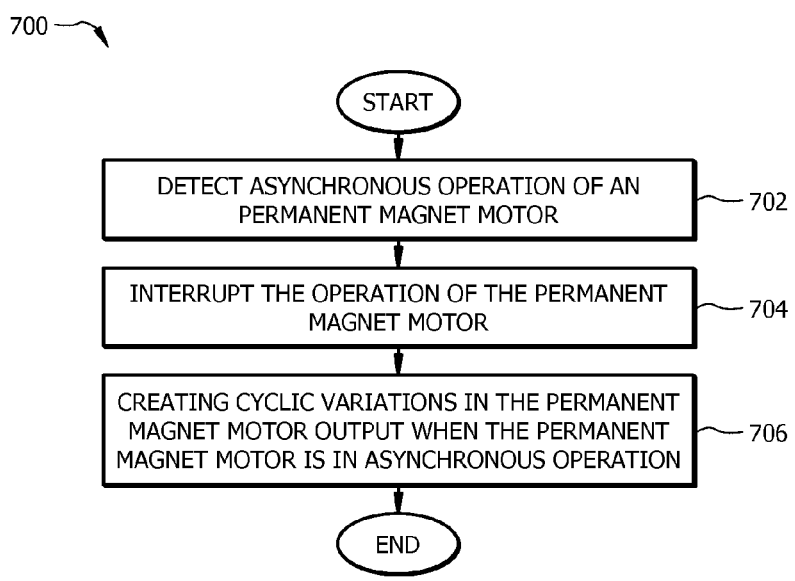
FIG. 7 is flow chart of an embodiment of method used to perform asynchronous operation on a PMM.

FIG. 7 is a flow chart of an embodiment of a method 700 used to perform asynchronous operation on a PMM. In one embodiment, method 700 may be implemented by an operator, a motor control system (e.g., a VSD), an external control logic device or combinations thereof. In one embodiment, the external control logic device, such as a data acquisition system, may provide instructions to the motor control system to implement one or more steps of method 700. In another embodiment, one or more steps of method 700 may be implemented using an external control logic device and without a motor control system that is attached to the downhole tool system. For example, in a MWD, method 700 may be implemented using an embedded microcontroller that is located within the MWD. Alternatively, one or more steps within method 700 may be implemented manually by an operator.

Method 700 may start at step 702 and detect asynchronous operation of a PMM during startup or during operation at running speed. In one embodiment, method 700 may monitor the motor drive signal, which may include the drive frequency and drive amplitude provided to the motor. In another embodiment, method 700 may detect asynchronous operation using the rate of change of current. If the rotor is started or operated in asynchronous operation (e.g., locked or in a near-locked condition), the current amplitudes and current wave form characteristics of the motor may be different from a typical amplitudes and waveforms. As shown in FIG. 4, in instances the rotor and stator magnetic field are rotating at different speeds, the current to the motor increases at a higher than expected rate as the stator field begins to rotate. For example, once the motor loses synchronism, the current may increase by up to 100-200% (e.g., a motor nominally drawing 40 A may increase its consumption to 80 A upon loss of synchronism). The relatively large amount of current may be detected and can be recognized by the VSD, allowing the operator and/or a control logic system (e.g., a microcontroller) to recognize the presence of asynchronous operation. However, a typical VSD is programmed to trip is the current reaches 150% of the nominal value. Additionally, a PMM in synchronous operation may typically have sinusoidal or near sinusoidal voltage and current signal characteristics. However, during asynchronous operation, the characteristics of the current signal may change abruptly with relatively large increases in current within a period of time proportional to the stator field rotational speed. In addition the current and voltage waveforms will be distorted and non-sinusoidal. Persons of ordinary skill in the art are aware that the change in the rate of current and the level of distortion may vary depending on the type of PMM motor, the type of VSD and the frequency of operation.

In another embodiment, step 702 of method 700 may detect asynchronous operation of a PMM by monitoring the change in frequency of the current motor drive signal. For example, the PMM may be fed power with a frequency of about 60 Hz. When the PMM is synchronized, the current signature is about 60 Hz. Once the PMM slips and operates in asynchronous operation, the current signature changes such that the frequency increases to about twice the provided line frequency (e.g., about 120 Hz if fed power frequency is about 60 Hz). In these particular embodiments, the change in frequency may be detected using an amp clamp. In another embodiment, at step 702, method 700 may monitor both the frequency and amplitude of the current motor drive signal to detect asynchronous operation of the PMM. Although monitoring the motor drive signal is one method in determining and detecting asynchronous operation of the PMM, persons of ordinary skill in the art are aware that other methods may be used to enable a VSD or other sensor systems to recognize the presence of asynchronous operation of the PMM.

After method 700 detects asynchronous operation of the PMM according to step 702, the method moves to step 704 and interrupts the operation of the PMM. If asynchronous operation of the PMM occurs during operation (e.g., at running speeds), the stator magnetic field may be discontinued by removing the motor drive signal or by reducing the drive amplitude and/or frequency. Afterward, the motor may start a normal startup procedure. If during normal startup asynchronous operation of the PMM is determined, the method interrupts the normal startup acceleration in the drive frequency and/or amplitude. Method 700 may also interrupt the normal startup acceleration if asynchronous operation occurs at startup (i.e., about zero RPM or the shaft is in a substantially locked position).

Subsequently, method 700 moves to step 706 and performs cyclic variations in the PMM torque when the PMM is in asynchronous operation. In one embodiment, to produce the cyclic torque variations, method 700 may vary the current frequency from a range of about 0.5 Hz to about 30 Hz and vary the motor current from about 10% to about 150% of the rated current. For example, method 700 may initially sweep the frequency ranges of about 0.5 Hz to about 20-30 Hz at a rated motor current of about 10%. The frequency sweep from about 0.5 Hz to about 30 Hz may have a total duration of about 5 to 10 seconds. Afterwards, method 700 may sweep the frequency ranges of about 0.5 Hz to about 30 Hz at a higher rated motor current (e.g. about 25% rated motor current). In another embodiment, method 700 may use a frequency sweep from about 60 Hz to about 120 Hz and vary the rated motor current from about 50% to about 150%. (e.g., for low voltage VSD). Adjustment of the current frequency determines the number of reversing impacts and adjustment of the current amplitude determines the magnitude of the reversing impact. For instance, increasing the frequency may increase the number reversing impacts and increasing the current amplitude increases the magnitude of the reversing impact. For an ESP system, the reversing impact of the rotor is translated to the pump shaft and may loosen debris within the pump and start rotation of the pump.

The resulting variations in torque and frequency of impact may loosen material (e.g., sand, scale, viscous fluids) restricting the rotation of the pump. A variety of combination of varying frequency and amplitude can be used to free the debris restricting pump rotation. Persons of ordinary skill in the art are aware that the ranges of frequency and amplitude of current to create the reversing impact are examples and that the ranges of frequency and amplitude may be adjusted depending on the design of the PMM motor. For instance, although rated motor currents greater than 150% may be applied, using a rated motor current greater than 150% increases the likelihood of creating torque that damages the motor and other pumping components. However, the minimum and/or maximum rated motor currents may vary depending on the PMM motor. In contrast to other methods used to free debris, method 700 at step 706 uses asynchronous operation of the PMM to restart rotation rather than applying external forces to free debris.

Figure 8:
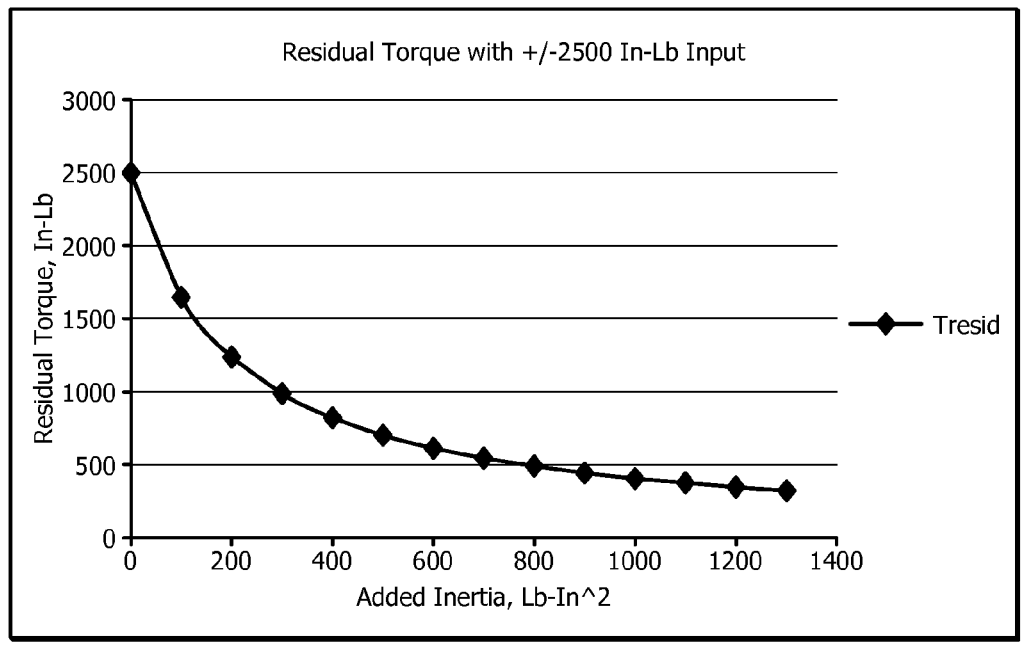
FIG. 8 illustrates a chart that correlates the torque with inertia for a PMM rotor.

FIG. 8 illustrates a chart that correlates the torque with inertia for a PMM rotor. Recall that the generation of relatively high torque levels by the interaction of the stator and rotor magnetic fields may cause damage to the motor, power transmission shafting or coupling, and to other components within the ESP system. In one embodiment, to reduce the amount of torque potentially applied to these components, components for storing inertial energy (e.g. pound-inch (lb-In$^2$)) may be added to the motor shaft to absorb the dynamic torque transients created in asynchronous operation of the PMM. By including inertial energy storage components on the PMM shaft, the PMM may produce reverse impacts at lower dynamic torques to loosen debris restricting an ESP pump or other down tool system from rotating. In other words, by increasing the inertia of the motor shaft, a PMM would produce lower torque levels to generate about the same reverse impact used to restart the rotation of an ESP pump when compared to a motor shaft with lower inertia. FIG. 8 illustrates the impact of inertia on reducing the dynamic torque transients based on a peak dynamic torque of 2500 In-lb. As shown in FIG. 8, increasing the inertia to about 800 lb-In$^2$ could lower the dynamic torque to about 500 In-lb. In comparison, a motor shaft with inertia of about 200 lb-In$^2$ would experience a dynamic torque of about 1100 In-lb.

Figure 9:
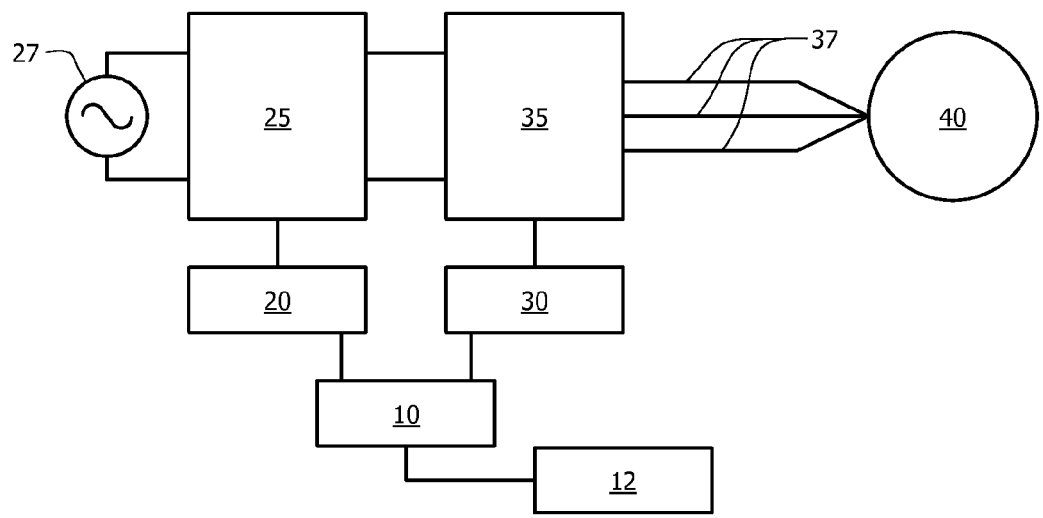
FIG. 9 is a schematic diagram of an embodiment of a motor control system.

FIG. 9 is a schematic diagram of an embodiment of the motor control system. The motor control system comprises a microcontroller 10 that controls a voltage control unit 20 and a pulse-width modulation controller unit 30. Power 27 is supplied and rectified in a rectification unit 25, before being fed to windings of the stator of the PMM 40 by switching unit 35. The rectification unit also supplies power at the steady voltage maintained by the voltage control unit 20, and the switching unit 35, under the control of the pulse-width modulation controller unit 30, supplies a number of windings (not shown) via supply lines 37 so that the poles (also not shown) of the permanent magnets on the rotor are attracted and/or repelled by the windings so that the rotor is caused to turn. The pulse-width modulation controller unit 30 along with the microprocessor 10 is configured to control the frequency with which the windings are switched on and off, each winding having the same frequency but out of phase with the other windings. The microprocessor 10 responds to an input device, such as a keyboard 12. In one embodiment, the input device may generate either an on-off signal for the motor to operate at a predetermined speed or a speed at which the PMM is to rotate.

The pulse width modulation controller unit 30 provides both frequency and voltage control by switching the supply so as to provide pulses (e.g., a sinusoidal or square wave supply) to each winding and determining the frequency of that supply, and defining the width of the DC pulses so as to define the root mean square voltage. The voltage control unit 20 operates in a conventional way to ensure a constant, ripple free DC supply from the rectifier 25 to the switching unit 35. Because the pulse width modulation controller unit 30 controls both the magnitude and the frequency of the voltage supplied to the motor windings, in a simplified system the voltage control unit 20 may be dispensed with, whereby the rectification unit 25 may then comprise a passive rectifier The microprocessor 10 may be implemented as one or more central processing unit (CPU) chips, or may be part of one or more application specific integrated circuits (ASICs) and/or digital signal processors (DSPs). The microprocessor 10 may comprise and/or be coupled to one or more non-transitory memory modules, such as non-volatile or volatile memory storage mediums. For example, the memory device may be random access memory (RAM), read only memory (ROM), flash memory, disk drives, tape drives, solid-state drives (SSDs) magnetic drives, and/or other memory devices used to store and execute instructions. The memory module may be used to house the instructions for carrying out the various embodiments described herein, e.g., performing asynchronous PMM operations.

Programming and/or loading executable instructions onto the monitor control system is well known in the art in order to transform the monitor control system in part into a particular machine or apparatus, e.g., a VSD. Implementing instructions, real-time monitoring, and other functions by loading executable software into a computer can be converted to a hardware implementation by well-known design rules. For example, decisions between implementing a concept in software versus hardware may depend on a number of design choices that include stability of the design and numbers of units to be produced and issues involved in translating from the software domain to the hardware domain. Often a design may be developed and tested in a software form and subsequently transformed, by well-known design rules, to an equivalent hardware implementation in an ASIC or application specific hardware that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it may be understood that the disclosed embodiments might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, the various embodiments described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

We claim:

1. A method comprising:
   detecting an asynchronous operation of a permanent magnet motor, having a rotor and a stator, within a downhole tool, wherein the downhole tool has experienced a failure of the rotor's ability to rotate resulting in the asynchronous operation, the asynchronous operation occurring when rotor and stator magnetic fields of the permanent magnet motor rotate at different speeds;
   interrupting the asynchronous motor operation for the permanent magnet motor, wherein the motor operation is associated with at least a drive frequency and a drive amplitude of the permanent magnet motor; and
   creating controlled cyclic variations in the permanent magnet motor output using controlled asynchronous operation of the permanent magnet motor, wherein the controlled cyclic variations are applied until the rotor's ability to rotate is restored.

2. The method of claim 1, wherein the cyclic variation is created by varying at least the drive frequency and the drive amplitude of the permanent magnet motor.

3. The method of claim 1, wherein the motor operation comprises a motor acceleration startup procedure and a motor operating speed.

4. The method of claim 1, wherein the drive frequency and the drive amplitude are related to a motor current.

5. The method of claim 1, wherein the asynchronous operation occurs at startup of the motor, during operation of the motor, or both.

6. The method of claim 1, further comprising discontinuing a stator magnetic field after detecting the asynchronous operation of the permanent magnet motor, and wherein detecting the asynchronous operation of the permanent magnet motor comprises sensing the current being delivered to the permanent magnet motor.

7. The method of claim 1, wherein the asynchronous operation of the permanent magnet motor occurs when a rotor of the permanent magnet motor is in a rotationally restricted condition such that as a current supplied to the motor increases, the rotor does not follow the stator, and wherein detecting asynchronous operation of the permanent magnet motor comprises analyzing a motor drive signal supplied to the permanent magnet motor.

8. The method of claim 1, wherein detecting the asynchronous operation of the permanent magnet motor comprises detecting relatively large changes in current in comparison to normal operation of the permanent magnet motor.

9. The method of claim 1, wherein detecting the asynchronous operation of the permanent magnet motor comprises detecting a relatively large frequency increase in comparison to normal operation of the permanent magnet motor.

10. The method of claim 1, wherein creating cyclic variations in the permanent magnet motor output using the asynchronous operation of the permanent magnet motor creates a reverse impact used to loosen debris restricting rotation of the downhole tool, and wherein the downhole tool is an electric submersible pump system.

11. An apparatus comprising:
    a microcontroller;
    a switching unit coupled to the microcontroller, wherein the switching unit is configured to transport one or more control signals between the microcontroller and switching unit, and
    wherein the microcontroller obtains computer executable instructions stored on a non-transitory medium that when executed by the microcontroller causes the apparatus to perform the following:
       determine that a rotor shaft within a permanent magnet motor, comprising the rotor shaft and a stator, is rotationally restricted resulting in an asynchronous operation, the asynchronous operation occurring when rotor and stator magnetic fields of the permanent magnet motor rotate at different speeds via the control signals transported by the switching unit;
       interrupt the asynchronous operation of the permanent magnet motor via an acceleration procedure for the permanent magnet motor that accelerates the permanent magnet motor at a prescribed drive frequency and a prescribed drive amplitude; and
       vary a plurality of frequencies of current and a plurality of amplitude of current supplied to the permanent magnet motor in a controlled fashion to produce controlled cyclic variations in the permanent magnet motor output resulting in reverse impacts, wherein the controlled cyclic variations are applied until the rotor's ability to rotate is restored.

12. The apparatus of claim 11, wherein the instructions, when executed by the microcontroller, further cause the apparatus to determine the rotor shaft is rotationally restricted by analyzing the amplitude of the control signals.

13. The apparatus of claim 12, wherein the instructions, when executed by the microcontroller, further cause the apparatus to determine the rotor shaft is rotationally restricted by monitoring a change in current frequency, a change in current amplitude, or both.

14. The apparatus of claim 11, wherein the rotor shaft is rotationally restricted during operation of either an electric submersible pump or a measurement-while-drilling system.

15. The apparatus of claim 11, wherein the instructions, when executed by the microcontroller, further cause the apparatus to remove the control signals supplied to the motor via the switching unit after determining the rotor shaft is rotationally restricted.

16. A method comprising:
    identifying a rotor of a permanent magnet motor is substantially locked using a motor drive signal supplied to the permanent magnet motor, the motor comprising the rotor and a stator, wherein the motor has experienced a failure of the rotor's ability to rotate resulting in an asynchronous operation, the asynchronous operation occurring when rotor and stator magnetic fields of the motor rotate at different speeds;
    discontinuing the asynchronous current operation of the permanent magnet motor, wherein the current operation is related to at least a current frequency and a current amplitude of the permanent magnet motor; and
    creating controlled cyclic impacts using the permanent magnet motor by varying the current frequency, the current amplitude, or both after identifying the rotor of the permanent magnet motor is substantially locked, wherein the controlled cyclic impacts are applied until the rotor's ability to rotate is restored.

17. The method of claim 16, wherein varying the current frequency, the current amplitude, or both comprises a prescribed series of current frequencies and current amplitudes delivered to the permanent magnet motor that increases at periodic intervals.

18. The method of claim 16, wherein identifying a rotor of a permanent magnet motor is substantially locked using a motor drive signal comprises detecting a distortion in a voltage waveform and a current waveform of the motor drive signal supplied to the permanent magnet motor.

19. The method of claim 16, wherein discontinuing a current operation of the permanent magnet motor comprises either removing the motor drive signal or reducing the amplitude of the motor drive signal and the frequency of the motor drive signal.

20. The method of claim 16, wherein the permanent magnet motor further comprises an inertial energy storage component disposed on a permanent magnet motor shaft, and wherein the inertial energy storage component stores energy to reduce the magnitude of the current frequency, the current amplitude, or both without reducing the cyclic impacts.

21. A method comprising:
detecting an asynchronous operation of a permanent magnet motor within a downhole tool;
interrupting a motor operation for the permanent magnet motor, wherein the motor operation is associated with at least a drive frequency and a drive amplitude of the permanent magnet motor;
creating cyclic variations in the permanent magnet motor output using asynchronous operation of the permanent magnet motor; and
discontinuing a stator magnetic field after detecting the asynchronous operation of the permanent magnet motor, and wherein detecting the asynchronous operation of the permanent magnet motor comprises sensing the current being delivered to the permanent magnet motor.

22. A method comprising:
detecting an asynchronous operation of a permanent magnet motor within a downhole tool;
interrupting a motor operation for the permanent magnet motor, wherein the motor operation is associated with at least a drive frequency and a drive amplitude of the permanent magnet motor; and
creating cyclic variations in the permanent magnet motor output using asynchronous operation of the permanent magnet motor;
wherein the asynchronous operation of the permanent magnet motor occurs when a rotor of the permanent magnet motor is in a rotationally restricted condition such that as a current supplied to the motor increases, the rotor does not follow the stator, and wherein detecting asynchronous operation of the permanent magnet motor comprises analyzing a motor drive signal supplied to the permanent magnet motor.

23. A method comprising:
detecting an asynchronous operation of a permanent magnet motor within a downhole tool;
interrupting a motor operation for the permanent magnet motor, wherein the motor operation is associated with at least a drive frequency and a drive amplitude of the permanent magnet motor; and
creating cyclic variations in the permanent magnet motor output using asynchronous operation of the permanent magnet motor;
wherein creating cyclic variations in the permanent magnet motor output using the asynchronous operation of the permanent magnet motor creates a reverse impact used to loosen debris restricting rotation of the downhole tool, and wherein the downhole tool is an electric submersible pump system.

24. A method comprising:
identifying a rotor of a permanent magnet motor is substantially locked using a motor drive signal supplied to the permanent magnet motor;
discontinuing a current operation of the permanent magnet motor, wherein the current operation is related to at least a current frequency and a current amplitude of the permanent magnet motor; and
creating cyclic impacts using the permanent magnet motor by varying the current frequency, the current amplitude, or both after identifying the rotor of the permanent magnet motor is substantially locked;
wherein varying the current frequency, the current amplitude, or both comprises a prescribed series of current frequencies and current amplitudes delivered to the permanent magnet motor that increases at periodic intervals.

25. A method comprising:
identifying a rotor of a permanent magnet motor is substantially locked using a motor drive signal supplied to the permanent magnet motor;
discontinuing a current operation of the permanent magnet motor, wherein the current operation is related to at least a current frequency and a current amplitude of the permanent magnet motor; and
creating cyclic impacts using the permanent magnet motor by varying the current frequency, the current amplitude, or both after identifying the rotor of the permanent magnet motor is substantially locked;
wherein the permanent magnet motor further comprises an inertial energy storage component disposed on a permanent magnet motor shaft, and wherein the inertial energy storage component stores energy to reduce the magnitude of the current frequency, the current amplitude, or both without reducing the cyclic impacts.

* * * * *